May 11, 1937. L. SCHIFF 2,080,381
PROCESS AND APPARATUS FOR ELECTRIC INSTANTANEOUS SPOT WELDING
Filed May 2, 1934
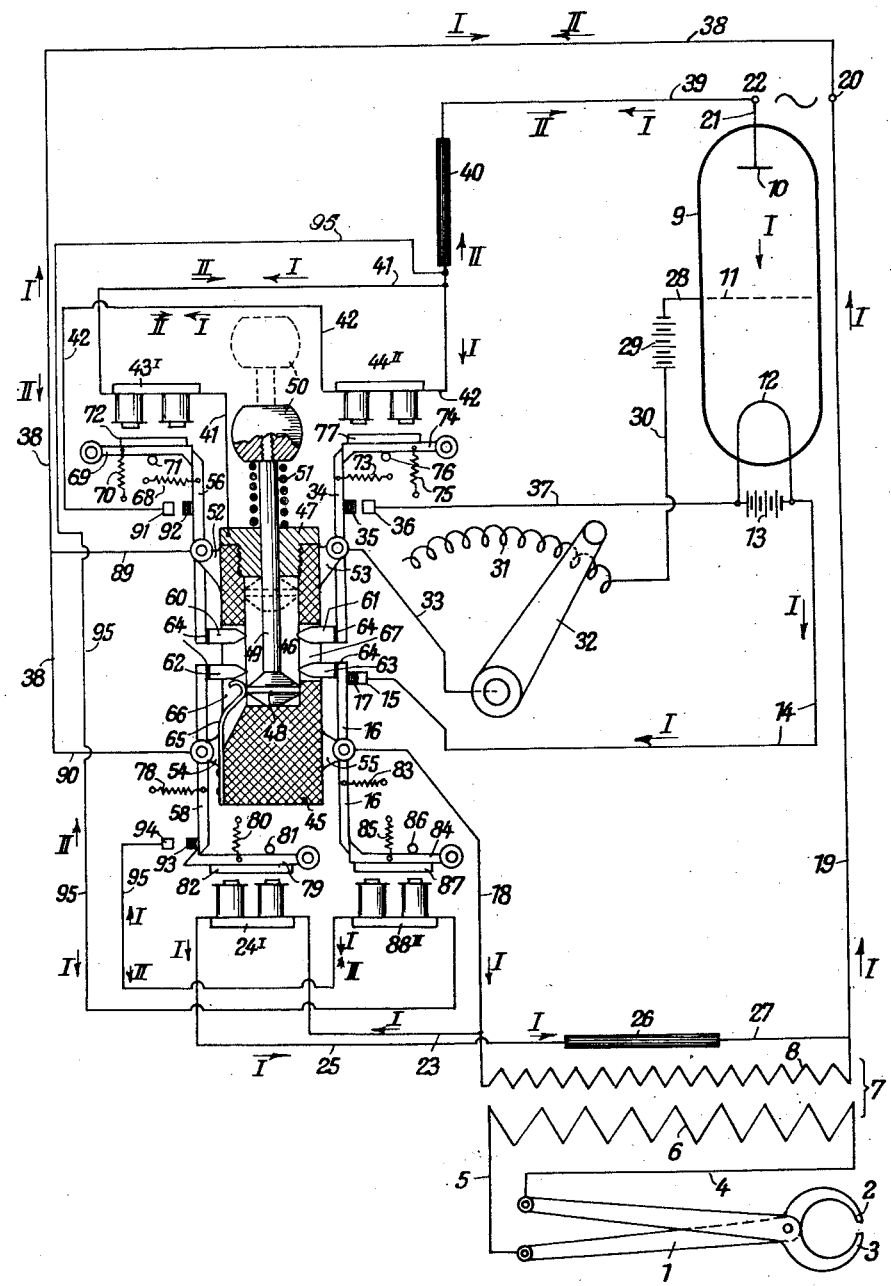
Inventor:
Ludwig Schiff.
By *[signature]*
Attorney Patented May 11, 1937

2,080,381

UNITED STATES PATENT OFFICE 2,080,381

PROCESS AND APPARATUS FOR ELECTRIC INSTANTANEOUS SPOT WELDING

Ludwig Schiff, Berlin-Lichterfelde, Germany, assignor to Edward G. Budd Manufacturing Company, Philadelphia, Pa.

Application May 2, 1934, Serial No. 723,472
In Germany January 27, 1933

10 Claims. (Cl. 250—27)

In electric spot welding in many cases, e. g. for welding thin sheets of austenitic stainless steel, it is necessary to apply high current intensity and to limit the duration of current application to a very short time. The required high intensity of current is produced by means of a transformer the secondary coil of which is connected with welding electrodes, whilst a current of high voltage is sent through the primary coil during the required interval.

An extremely short welding period is necessary in order to localize the heating effect to the welding spot and thus prevent the material surrounding the welding spot from being heated to an appreciable degree by diffusion of heat, so that the material, especially austenitic stainless steel, is not deteriorated in its molecular structure. At the same time by varying the length of the welding period one may determine the quantity of the electric energy which is consumed for a single welding spot. If there is .e. g. an alternating current of a certain intensity, and if the welding period is situated in the proximity of the maximum value of a half wave and symmetrically to this maximum value, then the quantity of the electric energy consumed for the single welding is approximately proportional to the length of the welding period. Assuming an alternating current of 50 cycles, and a welding period of 1/200 sec., the electric energy consumed under the above conditions will be a little more than twice the energy consumed with a welding period of 1/400 sec. The smaller the welding period is taken, the more exactly must be controlled the length of the welding period, as well as its situation within the current cycle. Asssuming a welding period of 1/500 sec., and an alternating current of 50 cycles, a variation of 1/1000 sec. would result in a variation of about 50 per cent in the electric energy consumed for a single welding spot. Moreover assuming a welding period of 1/500 sec., and an alternating current of 50 periods, the electric energy consumed for a single welding spot is reduced to 1/3 by shifting the welding period from the middle to the beginning of the half wave, i. e. by advancing the initiation of the welding period 1/250 sec. The electric energy consumed for a single welding spot being dependent on two different factors, i. e. the adjustable welding period and the regulatable intensity of the primary current, an accurate adjustment of the electric energy for the single welding spot is rendered difficult.

Now devices are known by which the welding period can be adjusted to any desired minute value, e. g. by the use of an insulated disk or drum continuously driven by a synchronous motor and carrying metallic annular sectors, and by means of adjustable contact levers sliding on the rotary disk and taking off the current from the annular sectors. By adjusting the welding period by means of such devices, not only the duration of the single welding operation, but at the same time with an alternating current of given frequency the quantity of the energy consumed for each single welding operation is determined. Such devices are relatively complicated owing to the synchronous motor, the required rapidly rotating controlling disk, and the displaceable contact levers sliding on the rapidly rotating contact disk. Furthermore they are relatively heavy owing to the largeness of the energy to be controlled directly in the primary circuit, and are complicated in structure owing to the careful insulation required by the high voltage with the result that an occurring fault is difficult to discover.

The invention is based on the following theory. For many purposes the adjustment of the short welding period can be dispensed with. On the contrary for many purposes a constant short period of e. g. 1/100 sec. suffices even for spot welding of thin sheets of stainless steel. Furthermore for many purposes no injury will result from a variation in the current flowing in the primary circuit during the short welding period, but the current may rise from naught to a maximum value and decrease to naught.

According to the present invention the current sent through the primary circuit is always a half wave of the alternating current. The alternating current must be so intense that one half wave gives the maximum electric energy required for one single welding spot. By throttling the half wave the electric energy is reduced to the quantity corresponding to the thickness and the nature of the sheets to be welded, and to the contact area of the welding electrodes to be used. Therefore the problem to be solved is to separate one single half wave of the alternating current which is throttled in the required degree and is sent through the primary coil of the transformer.

According to the invention the primary coil of the transformer is inserted into the anode circuit of a triode electron-tube which acting as a rectifier allows only alternate half waves, e. g. the negative ones of the alternating current, to pass for use in the welding circuit, suppressing the half cycles of opposite sign, and simultaneously permitting the throttling of such half waves to the required extent by control of the much less intense current of the grid circuit of the electron-tube.

Means are provided controlled by the alternating current, for initiating the closure of the grid circuit during a suppressed half cycle and initiating the opening of the welding circuit during the next succeeding suppressed half cycle thereby, in cooperation with the rectifying action of the tube, permitting but one half cycle to pass in the welding circuit. Such means are arranged to be set to effect only one such sequence of operation without repetition except at the will of the operator.

The invention is diagrammatically illustrated in the annexed drawing by way of example.

A pair of welding tongs 1 carries the two welding electrodes 2 and 3 which are connected to the ends of the secondary coil 6 of a transformer 7 by means of cables 4 and 5. 8 is the primary coil of the transformer. 9 is an electron-tube. 10 is the anode, 11 the grid, and 12 the incandescent cathode of the electron-tube 9. 13 is the heating battery for the incandescent cathode 12.

The latter is connected to one end of the primary coil 8 of the transformer 7, by means of a conduit 14, the contact piece 15, the contact piece 17 (contacting in the shown position the contact piece 15 and secured to the swing-lever 16) and the conduit 18. The other end of the primary coil 8 is connected to the one terminal 20 of an alternating current line, and the anode 10 is connected by a conduit 21 to the other terminal 22 of this line. The alternating current conducted to the terminals 20, 22 from the source of current is of such intensity that one half wave furnishes the maximum electric energy to be sent through the primary coil of the transformer.

A shunt is provided between the conduits 18 and 19 leading from the conduit 18 through the conduit 23, the bipolar electric magnet 24$^I$, the conduit 25, the resistance 26 and the conduit 27 to conduit 19.

The anode circuit lying between the terminals 20 and 22 and formed by electron tube 9, conduits 14 to 18, primary coil 8 of the transformer and conduit 19 as well as the shunt 23 to 27 can be traversed by the current, and this only in one direction, only when an electric potential is applied to the grid 11. Therefore only each alternate half wave of the alternating current is able to pass through the anode circuit. The direction of the negative current (electron flow) of this half wave is designated in the electron-tube and in all the conduits by arrow I.

The current sent through the primary coil 8 and the electron-tube 9 is controlled by controlling the current of the grid circuit. The external part of the grid circuit is formed by conduit 28, battery 29, conduit 30, rheostat 31, lever 32, conduit 33, rocking lever 34, contact piece 35 secured to lever 34, contact piece 36, and conduit 37 leading to the incandescent cathode 12. In the position shown the contact pieces 35 and 36 are out of contact with each other. Therefore the current of the grid circuit is interrupted and no current can flow through the anode circuit.

Other conduits 38 and 39 are connected with the terminals 20 and 22 respectively of the alternating current source and lead to the control devices to be described hereafter. The conduits 38 and 39 can be passed as well by the same half waves (in the direction I) which can flow through the anode circuit, as by the other half waves, i. e. in the opposite direction (II). An electric resistance 40 is inserted into the conduit 39. Beyond this resistance 40 two conduits 41 and 42 are branched off. A bipolar electric magnet 23$^I$ is inserted into the conduit 41, and a bipolar electric magnet 44$^{II}$ is inserted into the conduit 42.

45 is a controlling cylinder made of insulating material the bore 46 of which is closed at its top end by a head screw 47. A double-cone shaped piston 48 is slidable in the bore 46. The piston rod 49 is guided in a bore of the head screw 47 and carries a button 50. Between the button 50 and the head screw 47 is arranged a spring 51 which attempts to move the piston upwards into the position indicated by dotted lines. To the upper part of the cylinder 45 are secured the metallic bearings 52 and 53 and to the lower the metallic bearings 54 and 55. In each of the upper bearings 52 and 53 and of the lower bearings 54 and 55 a double-armed locking lever 56, 34, 58 and 16 respectively is provided. To the lower end of the lever 56 is attached a pin 60, to the lower end of the lever 34 a pin 61, to the upper end of the lever 58 a pin 62, and to the upper end of the lever 16 a pin 63. The pins 60—63 may be made of insulating material, or, as shown in the drawing, may be insulated from the levers bearing them by means of discs 64. A metallic plate-spring 65 is connected with the metallic bearing 54. The pins 60 and 62 as well as the metallic spring 65 pass through a slot 66, whereas the pins 61 and 63 pass through a slot 67 in the cylinder 45. Pins 60—63 can be moved by means of springs acting upon the levers 56, 34, 58 and 16, and the upper end of the leaf-spring 65 can be moved by its own elasticity toward the axis of the cylinder 45, so as to extend into the bore 46 of the cylinder 45.

When the workman operating the welding device presses the button 50 and the piston 48 against the action of the spring 51 from the upper end position shown in dotted lines into the lower end position shown in full lines, the pins 60—63 are moved outwardly into the positions shown in full lines in which positions the levers 56, 34, 58, 16 bearing the pins are retained by means of pawls. Further the piston 48 moves the upper end of the plate-spring 65 outwardly and engages in its lower position the plate-spring 65.

The upper end of the lever 56 is locked in the position shown against the action of spring 68 by means of a pawl 69 which is pulled by a spring 70 against a stop 71. The pawl 69 bears a polarized armature 72 consisting of a magnetized steel bar lying opposite the electric magnet 43$^I$. The attraction of the armature 72 and the release of lever 56 take place only, when a current in the direction of the arrow I flows through the electric magnet 43$^I$.

The upper end of the lever 34 is kept locked in the shown position against the action of spring 73 by a pawl 74 which is retracted against a stop 76 by means of a spring 75. The pawl 74 bears a polarized armature 77 consisting of a magnetized steel bar lying opposite the electric magnet 44$^{II}$. The attraction of armature 77 and the release of lever 34 take place only, when a current in the direction II flows through the electric magnet 44$^{II}$.

The lower end of the lever 58 is kept locked in the shown position against the action of spring 78 by a pawl 79 which is retracted against a stop

81 by means of a spring 80. The pawl 79 bears a polarized armature 82 consisting of a magnetized steel bar lying opposite the electric magnet 24ᴵ. The attraction of armature 82 and the release of lever 58 take place only, when a current in the direction I flows through the electric magnet 24ᴵ.

The lower end of the lever 16 is kept locked in the shown position against the action of spring 83 by a pawl 84 which is retracted against a stop 86 by means of a spring 85. The pawl 84 bears a polarized armature 87 consisting of a magnetized steel bar lying opposite the electric magnet 88ᴵᴵ. The attraction of armature 87 and the release of lever 16 take place only, when a current in the direction II flows through the electric magnet 88ᴵᴵ.

The conduit 41 is connected to the metallic head screw 47. Two conduits 89 and 90 are branched off from the conduit 38. The conduit 89 is connected to the lever 56. The conduit 90 is connected to the lever 58 and thereby to the plate-spring 65. The conduit 42 terminates into a contact piece 91 lying opposite a contact piece 92 secured to a lever 56. In the shown, locked position of the lever 56 the two contact pieces 91 and 92 are not in contact with each other. When the lever 56 is released from its pawl, i. e. exposed to the action of spring 68, the contact piece 92 and the contact piece 91 come into contact with each other.

A contact piece 93 lying opposite a contact piece 94 is secured to the lever 58. The contact piece 94 is connected to the conduit 42 by the conduit 95 comprising the electric magnet 88ᴵᴵ.

The references I and II added to the electric magnets 43ᴵ, 44ᴵᴵ, 24ᴵ, 88ᴵᴵ respectively indicate, whether the polarized armatures lying opposite the electric magnets are attracted according as when the current flows through the respective electric magnet in the direction I or in the direction II.

All parts are shown in the position they occupy immediately before the beginning of a single spot welding.

In the shown position of the parts no current can flow through the primary coil 8 lying in the anode circuit, even when the current of the alternating current source flows in the direction I, since owing to the locking of the lever 34 by the pawl 74 the grid circuit is interrupted between the contact pieces 35 and 36. In order that the primary coil be traversed by the current during a whole half wave flowing in the direction of arrow I, the contact between the contact pieces 35 and 36 must be effected by disengaging the pawl 74 during the preceding half wave flowing in the direction of arrow II, thereby closing the grid circuit. The disengaging of the pawl 74, to permit engagement between the contact pieces 35 and 36 and the closing of the grid circuit, is effected by means of the electric magnet 44ᴵᴵ. Now if the circuit through the electric magnet 44ᴵᴵ for releasing the pawl 74 could be closed directly by the workman, it might happen that the circuit would be closed only at the end of the half wave in direction II, and the short time required for moving the pawl 74, for rocking the lever 34, and for engaging the contacts 35, 36 would extend beyond the beginning of the period of the next half wave. This would result in the current flowing through the primary coil 8 not during the whole period of the next half wave, but only during part thereof. In this case the electric energy consumed for the single spot welding would not correspond to the whole half wave, but only to part thereof, and therefore would not suffice for the single spot welding. According to this invention also this fault is avoided by the device shown.

By the system described hereafter, a whole half wave of the alternating current in the direction I throttled down to the desired intensity is sent through the primary coil 8 of the transformer 7, i. e. the current starts at the beginning of the half wave and is interrupted automatically at the end of the half wave.

When the piston 48 is pressed down into its lower end position, an electric connection between the terminals 20 and 22 is accomplished, i. e. over conduit 38, conduit 90, leaf-spring 65, piston 48, piston rod 49, head screw 47, conduit 41, resistance 40 and conduit 39. The grid circuit remains interrupted between the contacts 35 and 36. By the next half wave of the alternating current flowing in the direction I the armature 69, 72 is attracted by means of the electric magnet 43ᴵ, and thereby the lever 56 is exposed to the action of the spring 68. The contact pieces 91 and 92 comes into engagement with each other. Now the terminals 20, 22 are connected through conduit 38, conduit 89, lever 56, contact pieces 92, 91, conduit 42, resistance 40 and conduit 39. The following half wave flowing in the direction of arrow II actuates the electric magnet 44ᴵᴵ. The armature 74, 77 is attracted, the lever 34 is released, and the contact 35 comes into engagement with the contact 36. The grid circuit is now closed. The intensity of the current flowing through the grid circuit depends upon the position given to the lever 32 of the rheostat 31.

During the half wave flowing in the direction II no current flows through the primary coil 8, since the anode current can pass the electron-tube 9 in the direction I only. However, the next half wave flowing in the direction I can now pass the primary coil 8 and at the same time the branch conduit 23, the electric magnet 24ᴵ, the conduit 25, the resistance 26 and the conduit 27. The pawl 79 is attracted by the electric magnet 24ᴵ. Consequently the lever 58 is rocked by the spring 78. The contact pieces 93 and 94 now come into engagement, closing the following circuit: conduit 38, conduit 90, lever 58, contact pieces 93, 94, conduit 95 and the electric magnet 88ᴵᴵ comprised by the latter, conduit 42 and conduit 39 with the resistance 40 comprised by the latter. During the half wave flowing in the direction I the polarized armature 87 is not yet attracted by the electric magnet 88ᴵᴵ. Therefore the contact between the contact pieces 15 and 17 comprised in the anode circuit is not interrupted, since the electric magnet 88ᴵᴵ is only able to attract the polarized armature 87, when a current flows in the direction II. Therefore the anode circuit remains closed for the present, and through the primary coil 8 a current flows during the whole half wave flowing in the direction I. But when the next half wave flows in the direction II through the electric magnet 88ᴵᴵ, the armature 87 and the pawl 84 are attracted. The lever 16 is exposed to the action of its spring 83, and the anode circuit is interrupted between the contacts 15 and 17. Therefore the next following half wave cannot flow through the primary coil 8.

Now when the workman releases the button 50, the piston 48 is by the action of the spring 51 moved to its upper end position, thereby returning the four levers 56, 34, 16 and 58 into their locked positions.

If before the beginning of a single spot welding one or several of the four levers should not be in such locked position, these levers will be brought positively into their locked position during the downward movement of the piston 48, before the circuit through magnet 43¹ is closed by the contact of piston 48 with spring 65, and therefore before the next single spot welding is initiated and completed by means of the movements of the pawls and levers automatically following each other as described above.

As the pawls can be made extremely light, electric magnets chosen within wide limits of any desired strength, the levers for closing and opening the contacts made extremely light, the springs actuating the levers made of any desired strength within wide limits, and because the pawls as well as the levers have to make only very slight rocking movements, the pawls and levers can be positively so accelerated that each of the required closings and openings of the contacts can be executed in less than 1/100 sec.

In the diagrammatic drawing the polarized armatures and the bipolar electric magnets lie in the rocking plane of the respective pawls.

Preferably the polarized armatures are secured to the ends of the respective pawls perpendicularly to them, and the bipolar magnets in front of them are arranged too in planes perpendicular to the rocking plane of the respective pawls.

By means of the very simple device described and shown which needs neither a special motor nor any rotating parts, the electric energy consumed for each single spot welding can be determined with the greatest exactness in a single and reliable manner.

What I claim is:

1. A circuit control system comprising a circuit to be controlled, a source of alternating current, rectifying means connecting said source with said circuit and polarized switching means in said circuit operatively connected with said source only in response to current flow from said source in a direction opposite to that permitted by said rectifying means.

2. A circuit control system comprising a circuit, a source of alternating current, current rectifying means connecting said source to said circuit to suppress the flow of alternate half cycles of the alternating current and polarized switching means connected for energization by said source of alternating current and connecting and disconnecting said circuit only during one of said alternate half cycles.

3. A current control system comprising a circuit to be controlled, a source of alternating current, current rectifying means connecting said source to said circuit to suppress the flow of alternate half cycles of the alternating current and switching means controlled in timed relation with the cycle of the alternating current and operable independently of the rectifier for initiating the closure of said circuit during a suppressed half cycle and interrupting the circuit at a point in the cycle intermediate the zero points defining a subsequent suppressed half cycle.

4. A current control system comprising a work circuit, a source of alternating current, a grid controlled electron tube connecting said source with said circuit, and arranged to pass current only in one given direction, a grid circuit for said tube, means operable only during a half current cycle of said source in a direction opposite to that passed by said tube to close said grid circuit, and means operable only during a subsequent half current cycle in said opposite direction to open said circuit independently of said rectifying means.

5. A current control system comprising a circuit, a source of alternating current, a grid controlled electron tube connecting said source with said circuit for suppressing alternate half cycles of current, a grid circuit for said tube, normally open switching means in said grid circuit arranged to close said grid circuit at a point in the current cycle intermediate the zero points defining a suppressed half cycle, and normally closed switching means in said circuit arranged to open said circuit at a point in the current cycle intermediate the zero points defining a subsequent suppressed cycle.

6. In a current control system, a circuit, switching means in said circuit for closing and opening a gap in said circuit, means including an electron discharge device for periodically interrupting the circuit and means for operating said switching means to open the gap in the circuit during interruption of the circuit by said electron discharge device.

7. In a current control system, a circuit, switching means in said circuit for closing and opening a gap in said circuit, means including an electron discharge device for periodically interrupting the circuit for substantial intervals of time, and means for operating said switching means to open the gap in the circuit during a period separated by a substantial lapse of time from the beginning and ending of an interruption of the circuit by said electron discharge device.

8. In a current control system, a circuit, a rectifier connected in the circuit for suppressing alternate half cycles of a given direction, a switch in said circuit for closing and opening a gap in said circuit, and means for operating the switch to open the gap in the circuit during the interval intermediate the zero points in the current cycle defining a suppressed half cycle.

9. A current control system comprising a source of current, a circuit connected with said source and including a grid-controlled electron tube adapted to pass current in one given direction and suppress the flow of current in the opposite direction, a grid-control circuit for said electron tube, switching means in said grid circuit biased to move into closed position, locking means for holding said switching means in open position against said bias, polarized electrically operated grid-switch release means for releasing said locking means operable only by current flow from said source in the direction suppressed by said electron tube, a second switching means in said circuit biased to move into open position, a second locking means for holding said second switching means in closed circuit position, a second polarized electrically operated release means for said second locking means operable only by current flow from said source in the direction suppressed by said electron tube, a third switching means for connecting said grid-switch release means to said source biased to move into closed position, a third locking means for said third switching means, a third polarized electrically operated release means for said latter locking means operable only by current flow from said source in a direction passed by said electron tube, a fourth switching means in the circuit of said second releasing means biased to move into closed position, a fourth locking means for said fourth switching means, a fourth electrically operated release means for said fourth locking means operable only by current flow through said electron tube, and manual switching means controlling the connection of said third release means with said source.

10. A circuit control system comprising in combination with a circuit to be controlled, a source of alternating current, a rectifier, and a pair of relatively movable contacts all connected in series with said circuit, and means controlled in timed relation with the cycle of the alternating current for operating said contacts during that half of the current cycle which is suppressed by the rectifier.

LUDWIG SCHIFF.